United States Patent
Walia et al.

(10) Patent No.: US 6,678,274 B1
(45) Date of Patent: Jan. 13, 2004

(54) METHOD AND SYSTEM FOR MANAGING FORWARDING TABLES

(75) Inventors: Lakhinder Walia, Santa Clara, CA (US); Sanjay Jain, Santa Clara, CA (US)

(73) Assignee: Riverstone Networks, Inc., Santa Clara, CA (US)

( * ) Notice: Subject to any disclaimer, the term of this patent is extended or adjusted under 35 U.S.C. 154(b) by 0 days.

(21) Appl. No.: 09/364,502

(22) Filed: Jul. 30, 1999

(51) Int. Cl.[7] .............................................. H04L 12/56
(52) U.S. Cl. .................................. 370/395.52; 370/351
(58) Field of Search ........................... 370/392, 395.31, 370/401, 389, 351, 395.52

(56) References Cited

U.S. PATENT DOCUMENTS

| | | | | |
|---|---|---|---|---|
| 5,353,283 A | * | 10/1994 | Tsuchiya | |
| 5,473,598 A | * | 12/1995 | Takatori et al. | |
| 5,517,620 A | | 5/1996 | Hashimoto et al. | 395/200.15 |
| 5,600,807 A | | 2/1997 | Itoh et al. | |
| 5,649,109 A | | 7/1997 | Griesmer et al. | 395/200.17 |
| 5,872,783 A | * | 2/1999 | Chin | 370/392 |
| 5,938,736 A | * | 8/1999 | Muller et al. | 709/243 |
| 6,108,648 A | * | 8/2000 | Lakshmi et al. | 709/2 |
| 6,192,051 B1 | * | 2/2001 | Lipman et al. | 370/389 |
| 6,266,705 B1 | * | 7/2001 | Ullum et al. | 709/238 |

\* cited by examiner

Primary Examiner—Kenneth Vanderpuye
(74) Attorney, Agent, or Firm—Mark A. Wilson

(57) ABSTRACT

A system and a method for managing forwarding table lookups and updates involve maintaining a first forwarding table in a first memory and a second forwarding table in a second memory, and then utilizing the first forwarding table to forward packets while the second forwarding table is updated with current route entries. The second forwarding table is updated in the background and therefore conventional CPU speeds do not cause performance problems. Once the second forwarding table is completely updated, a forwarding table pointer is switched and the second forwarding table is utilized to forward packets while the first forwarding table is updated. Because the second forwarding table has been completely updated in the background, switching the forwarding table pointer causes newly arriving packets to be forwarded according to a forwarding table that is free of inconsistencies.

5 Claims, 4 Drawing Sheets

METHOD AND SYSTEM FOR MANAGING FORWARDING TABLES

FIELD OF THE INVENTION

The invention relates generally to routing packets in a packet-based network, and more particularly to a method and system for updating forwarding tables that are maintained by network routers.

BACKGROUND OF THE INVENTION

An internetwork such as a transmission control protocol/Internet protocol (TCP/IP) based intranet or the Internet consists of many interconnected routers. The internetwork has a network topology that must be mapped out, so that the interconnected routers can properly forward packets to other network nodes. Information concerning the topology of networks is stored by routers in forwarding tables and the forwarding tables are consulted by the respective routers each time packets are forwarded.

As the topology of networks change, routers communicate the topology changes to each others. The communicated changes are then incorporated into the forwarding table of each individual router. While updating a single entry in a forwarding table of a router does not present significant difficulties, in many cases the entire forwarding table must be updated. During the time that is required to update a forwarding table, inconsistencies in the table may develop and packets may be incorrectly forwarded because of the table inconsistencies. In order to ensure that a forwarding table is free of inconsistencies before packets are forwarded, it is best to forward packets only after the forwarding table has been completely updated. Although it is best to completely update the forwarding table before forwarding packets, as the rate of packets arriving at a router increases, the time available for updating the forwarding table decreases. As a result, packets must either be forwarded according to a forwarding table that has not been completely updated, or delayed until the forwarding table can be completely updated.

FIG. 1 represents a conventional forwarding table lookup engine 12 and forwarding table memory 14 that is used in an IP-based router to forward packets. When a packet enters the lookup engine, the destination IP address within the packet header is utilized to lookup a next hop address in the forwarding table. In order to properly reflect the current topology of the network, the forwarding table of the router is periodically updated with new route entries. A relatively long period of time is required to update a large portion of the forwarding table, and while the update is in progress, some portions of the forwarding table may not be consistent with the intended forwarding logic. As stated above, during the periods of inconsistency with the intended forwarding logic, it is possible that some packets will be incorrectly forwarded. In order to minimize periods of inconsistency within forwarding tables, it is desirable to update the forwarding tables as fast as possible during periods when no packets are arriving at the router.

One technique for increasing the speed of forwarding table updates involves equipping routers with faster central processing units (CPUs). Although faster CPUs may provide some performance benefits, when network traffic is heavy, faster CPUs are still not be able to complete large forwarding table updates during breaks between packets. As a result, packets must be forwarded utilizing an outdated or potentially inconsistent forwarding table, or packets must be delayed until the forwarding table update is complete, neither of which are desirable outcomes.

Another technique for increasing the speed of forwarding table updates involves making a working copy of a forwarding table before any updates have been made to the forwarding table. Updates are then made to the working copy of the forwarding table while the original forwarding table is utilized to forward packets. Once the working copy has been completely updated, the updated working copy is written over the original forwarding table in order to replace the original forwarding table with the updated working copy. Although this technique may speed up the update process, writing the working copy of the forwarding table over the original copy of the forwarding table takes a significant period of time. During periods of heavy network traffic, writing large forwarding table updates over the original forwarding table may require incoming packets to be forwarded according to an inconsistent forwarding table, or delayed until the forwarding table update is complete.

In view of the need to continuously update forwarding tables in routers and the need to avoid inconsistencies in forwarding tables, what is needed is a system and a method that allow a forwarding table to be updated at speeds provided by conventional CPUs, while eliminating inconsistencies in the forwarding tables that are being utilized to forward packets.

SUMMARY OF THE INVENTION

A system and a method for managing forwarding table lookups and updates involve maintaining a first forwarding table in a first memory and a second forwarding table in a second memory, and then utilizing the first forwarding table to forward packets while the second forwarding table is updated with current route entries. The second forwarding table is updated in the background and therefore conventional CPU speeds do not cause performance problems. Once the second forwarding table is completely updated, a forwarding table pointer is switched and the second forwarding table is utilized to forward packets while the first forwarding table is updated. Because the second forwarding table has been completely updated in the background, switching the forwarding table pointer causes newly arriving packets to be forwarded according to a forwarding table that is free of inconsistencies.

In a preferred embodiment, the system includes a lookup engine, a forwarding table pointer, two distinct blocks of forwarding table memory, and an update engine. The lookup engine receives incoming packets and looks at the packet headers to determine the destination of the incoming packets. After the destination of an incoming packet is identified, the lookup engine accesses one of the two forwarding tables to determine the best route (next hop) for the packet, based on the ultimate destination of the packet. Once the best route for the present packet is identified, the packet is forwarded to a switch fabric that is contained within the router.

The two distinct blocks of forwarding table memory allow for the simultaneous storage of two different forwarding tables. That is, the first forwarding table memory stores a first version of a forwarding table, and the second forwarding table memory stores a second version of a forwarding table. Typically, one version of the forwarding table is an updated version of the other forwarding table, although this is not critical. In a preferred embodiment, the two forwarding table memories have identical structure, so that the two forwarding table memories are interchangeable with each other.

The forwarding table pointer identifies which forwarding table memory is active. The active forwarding table memory stores the forwarding table that is accessed by the lookup engine to forward packets. When there are only two possible memories, a one-bit register can be used to identify either of the two forwarding table memories.

The forwarding table update engine coordinates the updates of the two forwarding tables that are stored in the respective forwarding table memories. The preferred forwarding table update engine utilizes conventional techniques to update the forwarding tables and is supported by a standard speed CPU.

In operation, the forwarding table pointer may identify the first forwarding table memory as the active forwarding table memory. The active forwarding table memory stores the forwarding table that is currently being utilized by the lookup engine to route incoming packets. The forwarding table memory that is not identified by the forwarding table pointer is not utilized by the lookup engine to route incoming packets, and is referred to as a secondary forwarding table memory.

While the first forwarding table is being accessed by the lookup engine to forward packets, the second forwarding table, which is stored within the second forwarding table memory, can be updated in the background by the update engine in order to reflect the current topology of the network. While the second forwarding table is being updated, it is not accessed by the lookup engine to forward packets, and as a result a potentially inconsistent forwarding table is not utilized to forward packets.

Once the second forwarding table has been adequately updated, the forwarding table pointer can be quickly switched, causing the second forwarding table memory to be accessed by the lookup engine instead of the first forwarding table memory. In a preferred embodiment, the switching between forwarding table memories occurs in approximately one clock cycle, providing a nearly instantaneous switch between forwarding table memories. As a result of the rapid switch between forwarding table memories, newly arriving packets are always forwarded according to consistent forwarding logic, even when network traffic is heavy.

Although the system for managing forwarding table lookups requires at least two distinct forwarding table memories, it should be appreciated that a system with more than two forwarding table memories can be implemented. For example, a system for managing forwarding table lookups may include four forwarding table memories that are each capable of storing unique forwarding table information. When four forwarding memories are present, the forwarding table pointer is able to identify one of the four forwarding table memories as the active forwarding table memory. The active forwarding table is accessed by the lookup engine to forward packets while the three secondary forwarding tables are available for updating.

An advantage of utilizing at least two forwarding table memories is that forwarding tables containing inconsistent route logic are not utilized to forward packets. Another advantage is that updates of the secondary forwarding table(s) can be performed in the background, relieving the burden on the CPU to perform extremely high-speed table updates.

DETAILED DESCRIPTION

Figure 1:
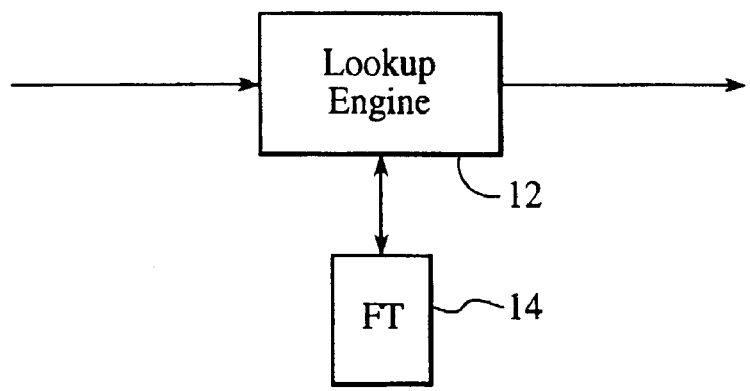
FIG. 1 represents a conventional forwarding table lookup engine and forwarding table memory.
Figure 2:
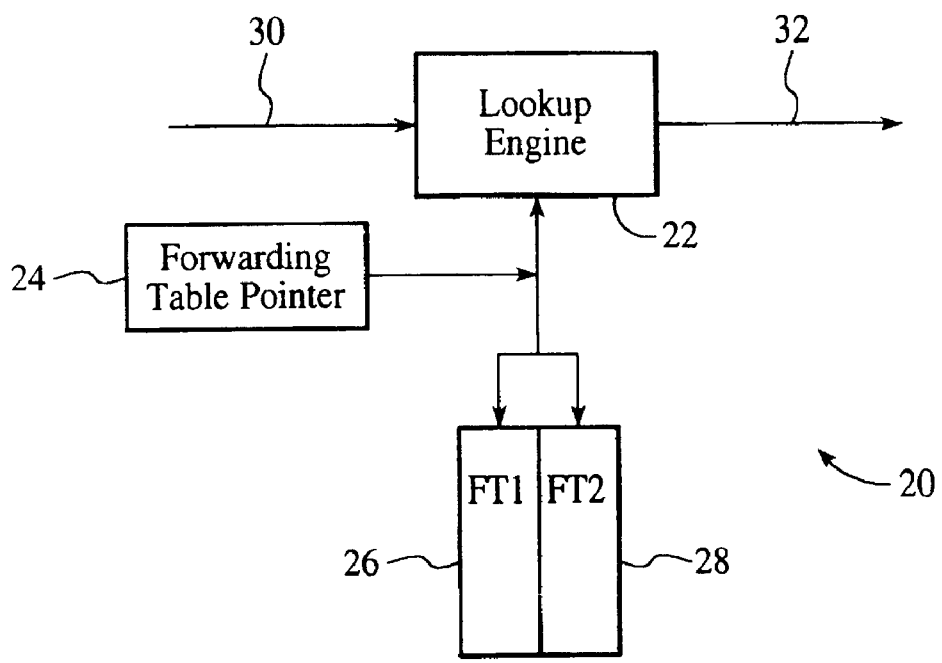
FIG. 2 is a depiction of a forwarding table management system that includes a lookup engine, a first forwarding table memory, a second forwarding table memory, and a forwarding table pointer, in accordance with the invention.

FIG. 2 is a depiction of a hardware-based system 20 for managing forwarding table lookups within a network that performs IP-based routing. The system includes a lookup engine 22, a forwarding table pointer 24, and two distinct blocks of forwarding table memory 26 and 28.

The lookup engine 22 receives incoming packets from a transmission media 30, such as copper wire or optical fiber, and looks at packet headers to determine the destination of incoming packets. In an IP-based network, each packet header contains a destination IP address that identifies the ultimate destination of the packet. After the destination IP address is identified, the lookup engine accesses one of the two forwarding tables 26 and 28 to determine the best route (next hop) for the packet, based on the ultimate destination of the packet. Accessing and updating the forwarding tables is the focus of the invention that is described in detail below. Once the best route for the present packet is identified, the packet is forwarded through an output 32 to a switch fabric that is contained within the router.

The two distinct blocks of forwarding table memory 26 and 28 allow for the simultaneous storage of two different forwarding tables. That is, the first forwarding table memory (FT1) 26 stores a first version of a forwarding table, and the second forwarding table memory (FT2) 28 stores a second version of a forwarding table. In an embodiment, each forwarding table memory includes approximately 1 MB of RAM and identifies up to 250,000 different routes. Typically, one version of the forwarding table is an updated version of the other forwarding table, although this is not critical. In a preferred embodiment, the two forwarding table memories have identical structure, so that the two forwarding table memories are interchangeable with each other. The identical structure may include identical physical structure and/or identical functional characteristics, such as identical pointer movement within the memory and/or identical methods for storing route attributes. It should be understood that although the preferred structure and/or function of the two forwarding table memories are identical, the contents of the forwarding tables stored within the memories are usually different.

The forwarding table pointer 24 identifies which forwarding table memory is active. As will be described in more detail below, the active forwarding table memory stores the forwarding table that is accessed by the lookup engine. In the system of FIG. 2, the forwarding table pointer identifies either the first forwarding table memory 26 or the second forwarding table memory 28 as the active memory. When there are only two possible memories, a one-bit register can be used to identify either of the two forwarding table memories. The size of the register can be expanded, as needed, to accommodate for more forwarding table memories.

Although not shown in FIG. 2, the system also includes a forwarding table update engine. The forwarding table update engine coordinates the updates of the two forwarding tables that are stored in the respective forwarding table memories. The preferred forwarding table update engine can be supported by a conventional CPU and utilizes conventional techniques to update the forwarding tables.

Figure 3:
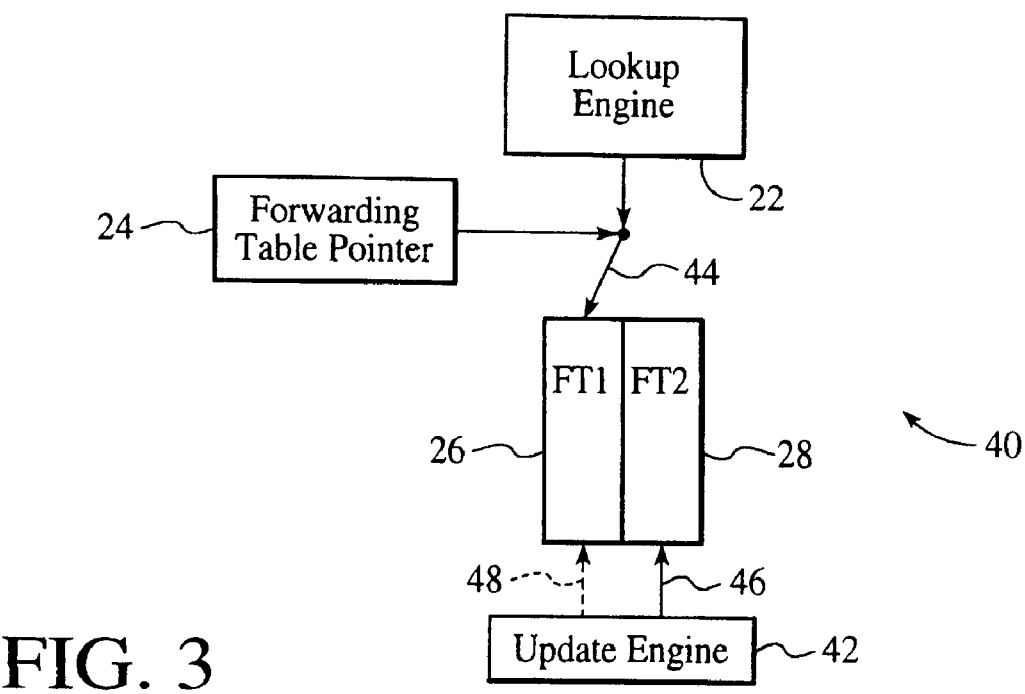
FIG. 3 is a graphical depiction of the first forwarding table memory of FIG. 2 being utilized to forward packets while the second forwarding table memory is updated, in accordance with the invention.

FIG. 3 is a graphical depiction of how the system 20 of FIG. 2 manages forwarding table lookups and forwarding table updates in order to minimize the amount of time that an inconsistent forwarding table is utilized to forward packets. The system 40 depicted in FIG. 3 includes an update engine 42 that is in communication with the two forwarding table memories 26 and 28. As indicated by the solid line 44 between the lookup engine 22 and the first forwarding table memory 26, the forwarding table pointer 24 identifies the first forwarding table memory as the active forwarding table memory. The active forwarding table memory stores the forwarding table that is currently being utilized by the lookup engine to route incoming packets. The forwarding table memory 28 that is not identified by the forwarding table pointer is not utilized by the lookup engine to route incoming packets, and is referred to as a secondary forwarding table memory.

While the first forwarding table memory 26 is being accessed by the lookup engine 22 to forward packets, the second forwarding table, which is stored within the second forwarding table memory 28, can be updated by the update engine 42 in order to reflect the current topology of the network. That is, while the first forwarding table is being utilized to route packets, the second forwarding table can be updated in the background without significantly degrading the performance of the router. The solid line 46, between the second forwarding table memory 28 and the update engine 42, indicates that the second forwarding table is being updated. The dashed line 48, between the first forwarding table memory 26 and the update engine, indicates that the first forwarding table is not being updated. While the second forwarding table is being updated, it is not accessed by the lookup engine to forward packets, and as a result a potentially inconsistent forwarding table is not utilized to forward packets.

Once the second forwarding table has been adequately updated, the forwarding table pointer 24 can be quickly switched, causing the second forwarding table memory 28 to be accessed by the lookup engine 22 instead of the first forwarding table memory 26. In a preferred embodiment, the switching between forwarding table memories occurs in one clock cycle, providing a nearly instantaneous switch between forwarding table memories.

Figure 4:
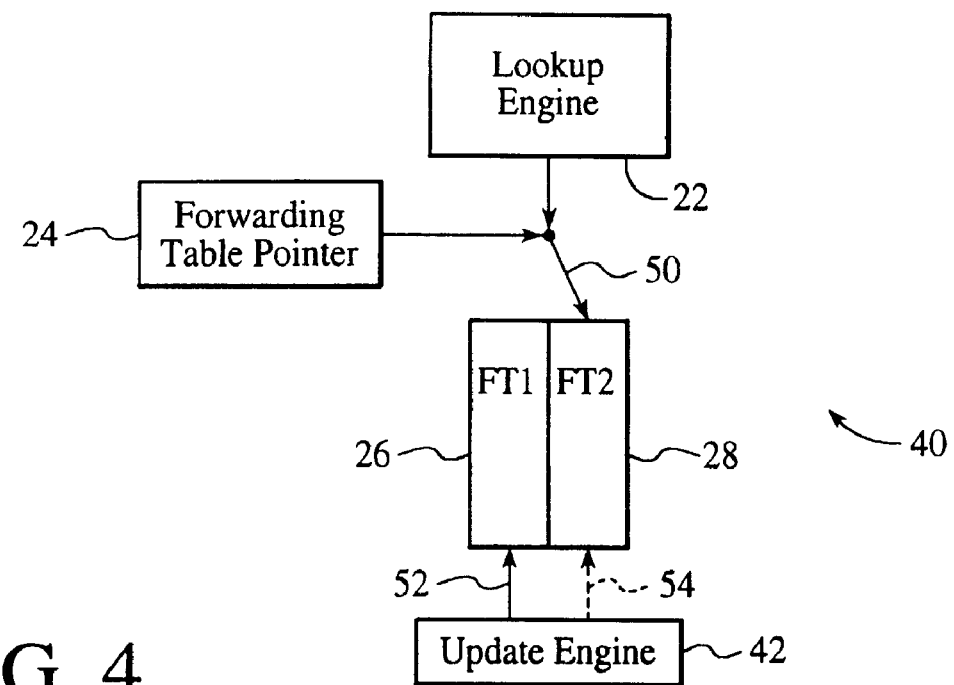
FIG. 4 is a graphical depiction of the second forwarding table memory of FIG. 2 being utilized to forward packets while the first forwarding table memory is updated, in accordance with the invention.

FIG. 4 is a graphical depiction of the forwarding table management system 40 after the active forwarding table memory has been switched. In FIG. 4, the solid line 50 between the lookup engine 22 and the second forwarding table memory 28 indicates that the second forwarding table is being utilized by the lookup engine to forward packets. The solid line 52 between the first forwarding table memory 26 and the update engine 42 indicates that the first forwarding table is being updated, while the second forwarding table is being utilized to forward packets. The dashed line 54, between the second forwarding table memory 28 and the update engine, indicates that the second forwarding table memory is not being updated.

Although in FIGS. 3 and 4 the secondary forwarding tables are being updated and the active forwarding tables are not being updated, the active forwarding tables can also be updated as needed. For example, if only minor changes need to be made to the active forwarding table, then it may be more efficient to simply update the active forwarding table instead of updating the secondary forwarding table and then switching tables. The dashed lines 48 and 54 between the update engine 42 and the active forwarding table memories (forwarding table memory 26 in FIG. 3 and forwarding table memory 28 in FIG. 4) indicate that the active forwarding tables can be updated while the tables are being utilized to forward packets.

Figure 5A:
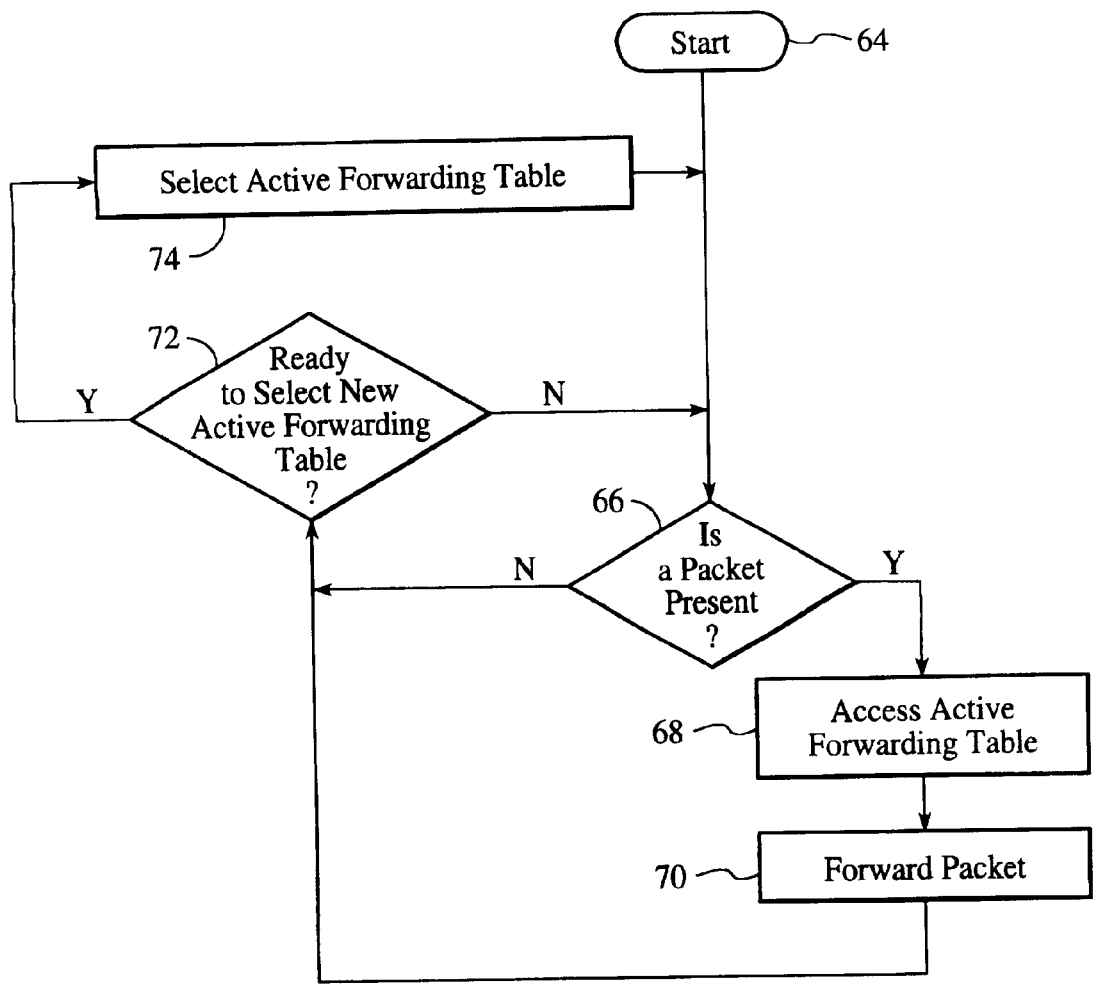
FIG. 5A is a process flow diagram that represents a preferred method for managing forwarding table lookups, in accordance with the invention.
Figure 5B:
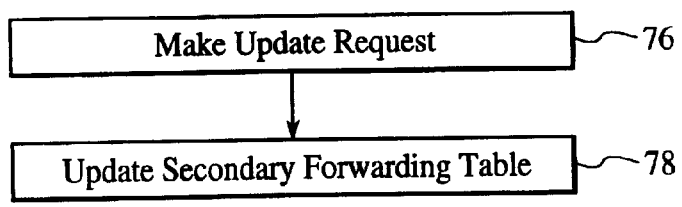
FIG. 5B is a process flow diagram that represents a preferred method for managing forwarding table updates, in accordance with the invention.

FIG. 5A is a process flow diagram that represents a preferred method for managing forwarding table lookups, and FIG. 5B is a process flow diagram that represents a preferred method for updating a secondary forwarding table. As described below, the processes depicted in FIGS. 5A and 5B are performed in parallel. With reference to FIG. 5A, the preferred method starts at step 64, with one of at least two available forwarding tables being established as the default active forwarding table. At decision point 66, if a packet is present for switching, then the active forwarding table is accessed in order to determine the next hop for the packet (Step 68). After the active forwarding table has been accessed and the next hop identified, the packet is forwarded (Step 70) to the switch fabric so that the packet can be routed to an output port that corresponds to the next hop. After the packet is forwarded, at decision point 72, it is determined if a new active forwarding table should be selected. Likewise, if a packet is not present for switching at decision point 66, the next logical step is still decision point 72.

The decision of whether or not to switch the active forwarding table (Decision point 72) is implementation specific and is not critical to the invention. Although it is not critical, example criteria may involve switching the forwarding tables only after the secondary forwarding table has been completely updated or after the secondary forwarding table has received a certain number of updated forwarding entries.

If it is determined, at decision point 72, that the active forwarding table should not be switched, then a check for the presence of another packet is made (Decision point 66). If a packet is present, then the packet is forwarded according to the active forwarding table (Steps 68 and 70). If a packet is not present, then decision point 72 is encountered again.

If it is determined, at decision point 72, that the active forwarding table should be switched, then a new active forwarding table is selected at step 74. After a new active forwarding table is selected, the process of checking for packets, accessing the active forwarding table, and forwarding packets, is repeated.

While packets are being received, processed, and forwarded (as shown in FIG. 5A), the secondary forwarding table is available to be updated, as shown in FIG. 5B. If it is necessary to update the secondary forwarding table, an update request is made (Step 76). After an update request is made, the secondary forwarding table is updated (Step 78).

The secondary forwarding table is updated in the background as packets are being received, processed, and forwarded. Completely updating a secondary forwarding table typically takes longer than processing a single packet, and therefore multiple packets are usually forwarded before a forwarding table is completely updated.

Figure 6:
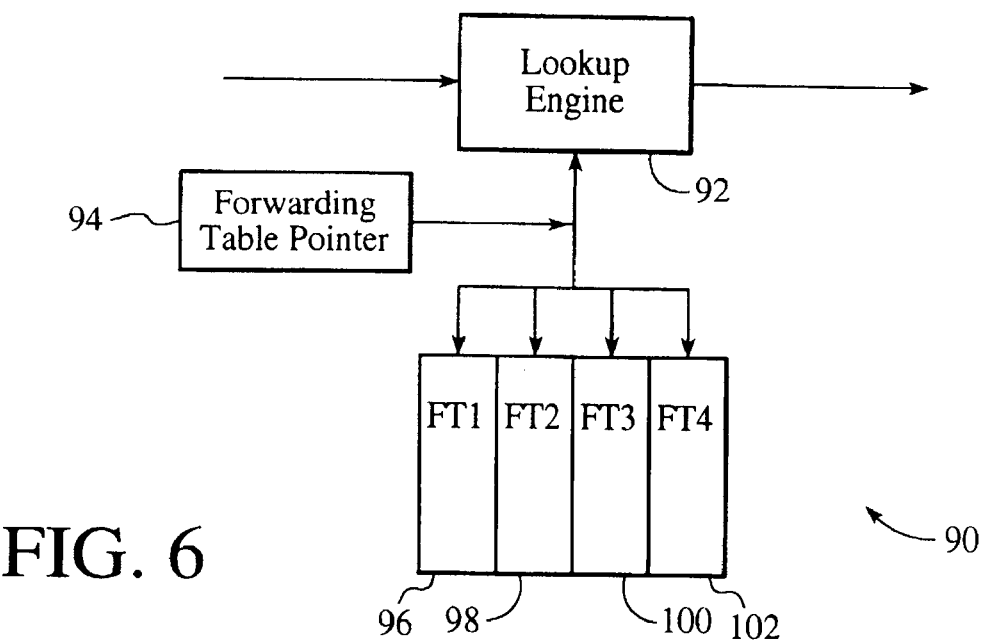
FIG. 6 is a depiction of a forwarding table management system that includes a lookup engine, first, second, third, and forth forwarding table memories, and a forwarding table pointer, in accordance with the invention.

Although the system and method for managing forwarding table lookups, as described with reference to FIGS. 2–5B, require at least two distinct forwarding table memories, it should be appreciated that more than two forwarding table memories can be utilized. FIG. 6 is a depiction of a system 90 for managing forwarding table lookups that includes four forwarding table memories, 96, 98, 100, and 102, each of which are capable of storing unique forwarding table information. In the system of FIG. 6, the forwarding table pointer 94 is able to identify one of the four forwarding table memories as the active forwarding table memory. The active forwarding table is accessed by the lookup engine 92 to forward packets while the three secondary forwarding tables are available for updating.

Figure 7:
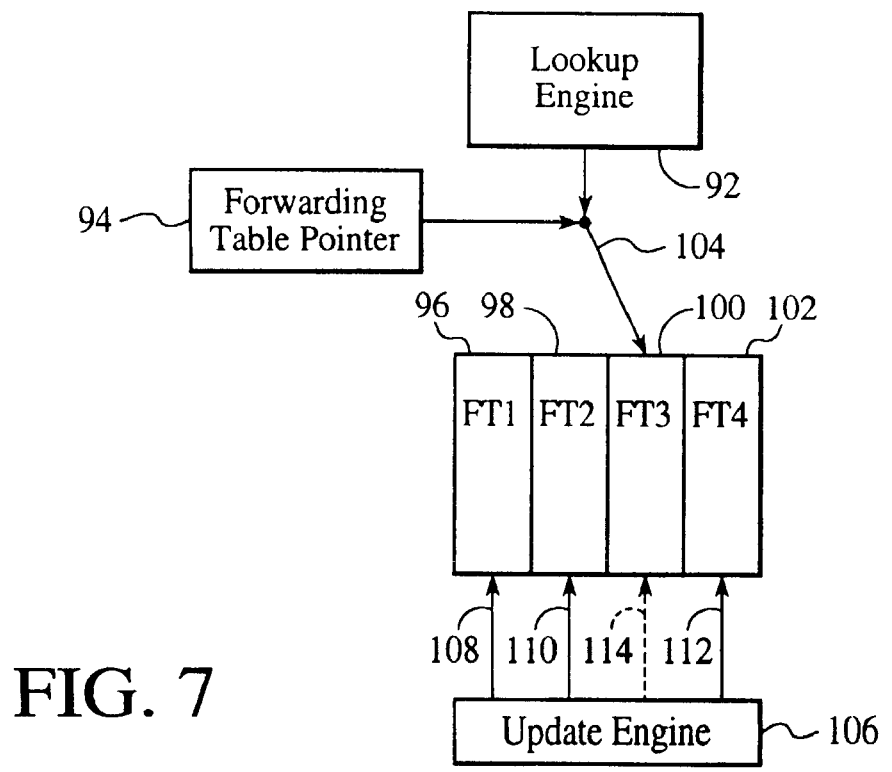
FIG. 7 is a graphical depiction of the third forwarding table memory of FIG. 6 being utilized to forward packets while the first, second, and forth memories are updated, in accordance with the invention.

FIG. 7 is a graphical depiction of how the system 90 of FIG. 6 manages forwarding table lookups and forwarding table updates. In the example of FIG. 7, the forwarding table pointer 94 points (solid line 104) to the third forwarding table memory 100, thereby identifying the third forwarding table memory as the active forwarding table memory. The lookup engine 92 accesses the third forwarding table in order to identify the next hop for incoming packets. While the lookup engine is accessing the third forwarding table, the three secondary forwarding tables 96, 98, and 102 are available for updating by the update engine 106. The solid lines 108, 110, and 112 between the update engine and the first, second, and forth forwarding table memories indicate that these forwarding table memories are available for updating. The dashed line 114 between the update engine and the active forwarding table memory 100 indicates that the active forwarding table memory is not available for updating. As stated above, although it is preferable to avoid updating the active forwarding table memory, the active forwarding table memory can be updated. Updating the active forwarding table memory creates the risk of utilizing an inconsistent forwarding table, however the risk may be minimal if only small updates (e.g., adding a single forwarding entry) are made.

Although it is preferable to implement the above described system and method in hardware, utilizing, for example, application specific integrated circuits, it is also possible to implement the system and/or method in software. In addition, although the system and method are described in an IP environment, the system and method can be implemented with other network protocols.

What is claimed is:

1. A method for changing forwarding information that is utilized to forward packets comprising the steps of:

selecting a first forwarding table from at least two stored forwarding tables, wherein a selected forwarding table is utilized to forward incoming packets and non-selected forwarding tables are not utilized to forward incoming packets;

utilizing said first forwarding table to forward incoming packets;

updating a second forwarding table while said first forwarding table is being utilized to forward incoming packets, said second forwarding table being one of said non-selected forwarding tables;

selecting said second forwarding table from said at least two stored forwarding tables after said second forwarding table has been updated, said step of selecting said second forwarding table causing said first forwarding table to become one of said non-selected forwarding tables;

utilizing said second forwarding table to forward incoming packets instead of said first forwarding table; and updating said first forwarding table while said second forwarding table is being utilized to forward incoming packets wherein said step of utilizing said first forwarding table to forward incoming packets includes a step of utilizing a first destination IP address to identify a first route entry, and wherein said step of utilizing said second forwarding table to forward incoming packets includes a step of utilizing a second destination IP address to identify a second route entry.

2. The method of claim 1 wherein said step of selecting said second forwarding table includes a step of changing a pointer that identifies either said first forwarding table or said second forwarding table as said selected forwarding table.

3. The method of claim 1 wherein said step of selecting said second forwarding table includes a step of switching, in one clock cycle, from utilizing said first forwarding table to forward incoming packets to utilizing said second forwarding table to forward incoming packets.

4. The method of claim 1 wherein said first forwarding table is stored in a first memory, and wherein said second forwarding table is stored in a second memory, said first memory being physically distinct from said second memory.

5. The method of claim 1 wherein said step of selecting said second forwarding table includes a step of switching from accessing a first forwarding table memory in order to forward incoming packets to accessing a second forwarding table memory in order to forward packets.

\* \* \* \* \*